March 25, 1958 B. J. BREZOSKY 2,828,085
WASTE DISPOSAL APPARATUS
Filed Oct. 15, 1956

INVENTOR.
BERNARD J. BREZOSKY
BY
HIS ATTORNEY

United States Patent Office 2,828,085
Patented Mar. 25, 1958

2,828,085

WASTE DISPOSAL APPARATUS

Bernard J. Brezosky, Louisville, Ky., assignor to General Electric Company, a corporation of New York Application October 15, 1956, Serial No. 615,789

2 Claims. (Cl. 241—100.5)

This invention relates to waste disposal apparatus of the type adapted to be connected to the drain opening of a sink, and has as its principal object the provision of an improved grinding mechanism for such apparatus.

Another object of this invention is to provide waste disposal apparatus with improved means for retaining movable grinding mechanism impellers on a rotary grinding member.

Further objects and advantages of the invention will become apparent as the following description proceeds, and the features of novelty which characterize the invention will be pointed out with particularity in the claims annexed to and forming a part of this specification.

Briefly stated, in accordance with one aspect of my invention there is provided a waste disposer including a generally cylindrical grinding chamber, a rotary grinding member including a radially extending slot having an enlarged portion and a narrow portion extending radially therefrom, an impeller mounted for pivotal movement in the slot about a pivot pin generally parallel to the axis of the rotary member, and a retaining member overlying the enlarged portion of the slot so as to lock the pivot pin in the narrow portion of the slot.

For a better understanding of the invention, reference may be made to the following description and the accompanying drawing in which.

Figure 1:
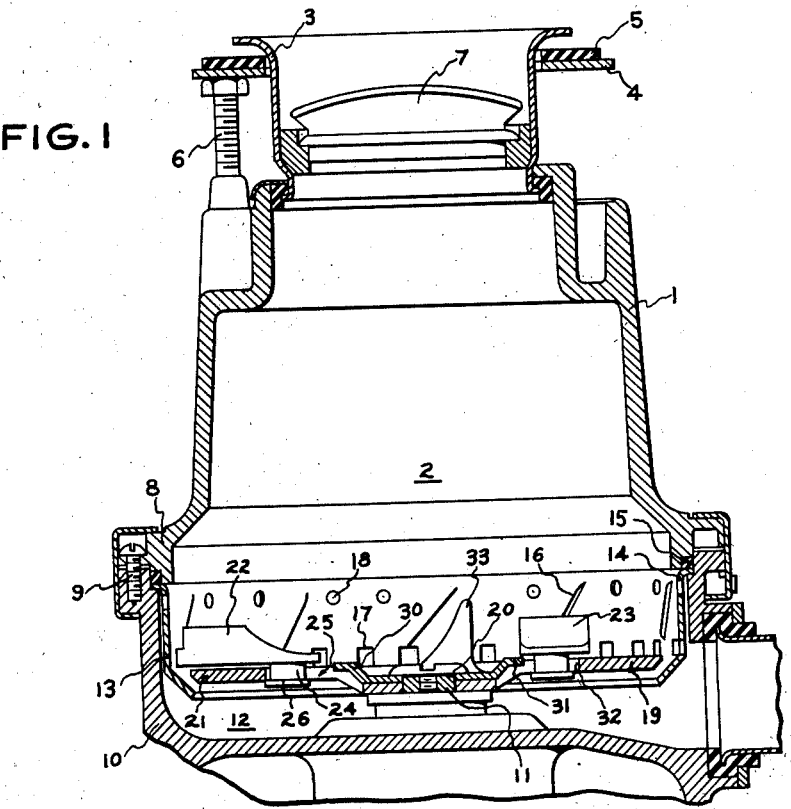
Fig. 1 is a fragmentary elevation view, in section, illustrating a waste disposal device incorporating this invention.

Referring to the drawing, there is shown a waste disposal device having a generally cylindrical casing or hopper 1 enclosing the grinding chamber 2 at the bottom of which the grinding or shredding of waste material takes place. The upper end of hopper 1 is provided with means suitable for supporting the device in the drain opening in a sink or the like, the supporting means including, for example, a flanged drain sleeve 3, a clamping ring 4, a sealing washer 5, and clamping bolts 6, all arranged so that the open top of hopper 1 may be supported in alignment with a sink drain opening. Preferably, the drain opening is equipped with a suitable drain stopper, which may be of the type disclosed in U. S. Patent No. 2,787,423 granted to Fred W. Moore and assigned to the assignee of the present application.

The lower end of hopper 1 is provided with a flange 8 which carries mounting screws 9 for securing a motor housing 10 to the hopper so as to form an integral structure. Mounted within motor housing 10 is an electric motor (not shown) provided with a vertically extending shaft 11 projecting into the chamber 12 defined by the upper walls of housing 10. Secured to the bottom of tubular hopper 1 is a generally cylindrical shredding ring 13 provided with a flange 14 at the top thereof which is clamped between flange 8 of the hopper and the upper end of motor housing 10 so that the shredding ring is stationary with respect to the hopper, the joint being sealed by a gasket 15. Shredding ring 13 is provided with a plurality of shredding projections 16 on its inner surfaces, a plurality of openings 17 through which the comminuted material is expelled during grinding operations, and a row of apertures 18 arranged to drain excess water from the comminuting zone. Projections 16, openings 17 and apertures 18 may be conveniently formed by lancing or stamping operations, or by any other suitable means. The arrangement and functions of shredding ring 13 are more fully described and claimed in application Serial No. 553,119 filed December 14, 1955 by Herbert J. Macemon and assigned to the assignee of the present application.

In accordance with the present invention I provide a rotary grinding member, generally designated by the numeral 19, fixedly secured to the upper end of motor shaft 11, by means of a fastening screw 20, for example, and provided with impelling means secured thereto by novel structure to be described below. Rotary grinding member 19 includes a generally cylindrical flywheel or table 21 having a running clearance with the lower edge portion of shredding ring 13, and a pair of impellers 22 and 23 pivotally mounted on flywheel 21 for movement about an axis generally parallel to the axis of rotation of motor shaft 11. Impellers 22 and 23 are mounted on opposite sides of the axis of flywheel 21 and are preferably identical, only impeller 22 being described in detail herein.

Figure 2:
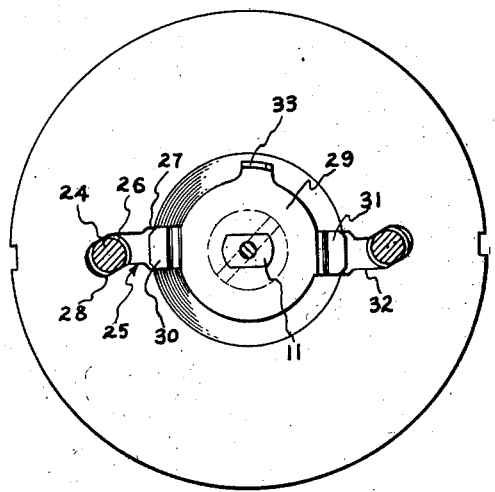
Fig. 2 is a top plan view, partly in section, of the rotary grinding member of the invention.

Impeller 22 is provided with an integrally formed pivot pin 24 located in a generally radial slot 25 in flywheel 21, and retained therein by a collar 26 on the lower end of the pin 24. As shown in Fig. 2, slot 25 includes an enlarged portion and a narrow portion 28 extending generally radially therefrom, but actually inclined at a slight angle to a radius of the flywheel. Enlarged portion 27 of slot 25 is sufficiently large to receive collar 26 of the pivot pin, while narrow portion 28 of the slot will accommodate only the pivot pin 24. As disclosed in application Serial No. 615,810 filed on October 15, 1956 by Herbert J. Macemon and assigned to the assignee of the present application, it is desirable that provision be made for some rectilinear movement along narrow portion 28 of slot 25 in addition to pivotal movement of the impeller about the axis of pin 24, and consequently slot portion 28 is somewhat longer than the diameter of pin 24. Pin 24 is retained in narrow slot portion 28 by retaining member 29 which is clamped between the head of mounting screw 20 and the central top surface of flywheel 21, retaining member 29 being provided with a radially extending ear 30 which overlies enlarged portion 27 of slot 25 and limits radial movement of pin 24. Retaining member 29 also includes a similar ear 31 which cooperates with slot 32 in which the oppositely disposed impeller 23 is located. If desired, retainer 29 may be provided with a fixed upwardly extending agitating member 33 offset from the axis of rotation of flywheel 19 so as to displace waste material settling in the central portion of the grinding chamber.

It will be evident that the impeller mounting arrangement of this invention greatly facilitates assembly inasmuch as it is only necessary to place the impellers on the flywheel with pivot pin 24 extending through enlarged portion 27 of slot 25, thus allowing the impeller to be shifted to the position shown in the drawing in which collar 26 underlies flywheel 21. Assembly of the rotary grinding member is completed by fitting the flywheel 21 on motor shaft 11, placing the retaining member 29 on top of flywheel as illustrated, and securing the parts together by means of an axial screw 20.

While I have shown and described a specific embodiment of this invention I do not desire the invention to be limited to the particular construction shown and described, and I intend by the appended claims to cover all modifications within the true spirit and scope of the invention.

What I claim as new and desire to secure by Letters Patent of the United States is:

1. Waste disposal apparatus for use with a sink having a drain opening comprising a housing providing a generally cylindrical grinding chamber and having at its upper end an inlet opening for water and waste material, mounting means for securing said housing to sink with said inlet opening in alignment with said drain opening, fixed shredding members adjacent the inner wall of said chamber, a rotatable circular grinding wheel mounted at the bottom of said chamber for rotation about an axis aligned with the axis of said chamber, said flywheel being secured by means of an axially aligned screw to the upper end of a motor shaft carried by said housing, said flywheel having a pair of generally radial slots therein disposed on diametrically opposed sides of said axis, each of said slots having an enlarged portion at its end nearest said axis and a narrow portion extending generally radially therefrom, a movable impeller associated with each of said slots, each of said impellers including a pivot pin extending through the slot, a retaining collar on the end of each of said pivot pins adapted to retain the pin in the narrow portion of the slot, said collar being smaller than the enlarged portion of the slot, and an impeller retaining member secured to said rotatable member by said screw, said retaining member including ear portions overlying the enlarged portion of each of said slots.

2. Waste disposal apparatus in accordance with claim 1 in which said retaining member also includes an upwardly extending agitator portion offset from said axis of rotation.

References Cited in the file of this patent

UNITED STATES PATENTS

| | | |
|---|---|---|
| 642,016 | Sturtevant | Jan. 23, 1900 |
| 2,647,294 | Davis | Aug. 4, 1953 |
| 2,661,909 | Hammell | Dec. 8, 1953 |
| 2,753,121 | Elfenbein | July 3, 1956 |
| 2,760,730 | Jordan | Aug. 28, 1956 |